(12) United States Patent
Tripp

(10) Patent No.: US 8,607,352 B2
(45) Date of Patent: Dec. 10, 2013

(54) CLASSIFICATION OF CODE CONSTRUCTS USING STRING ANALYSIS

(75) Inventor: Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/006,248

(22) Filed: Jan. 13, 2011

(65) Prior Publication Data

US 2012/0185943 A1    Jul. 19, 2012

(51) Int. Cl.
*G06F 21/00*    (2013.01)
(52) U.S. Cl.
USPC .......................................... 726/25; 717/126
(58) Field of Classification Search
None
See application file for complete search history.

(56) References Cited

PUBLICATIONS

James Newsome et al. Dynamic Taint Analysis for Automatic Detection, Analysis, and Signature Generation of Exploits on Commodity Software, May 2004, CMU-CS-04-140.*
Livshits et al., "Finding Security Vulnerabilities in Java Applications with Static Analysis," SSYM'05 Proceedings of the 14th Conference on USENIX Security Symposium, 2005, vol. 14: pp. 1-16.
Kiezun et al., "HAMPI: a solver for string constraints," ISSTA '09 Proceedings of the Eighteenth International Symposium on Software Testing and Analysis, Jul. 2009: pp. 1-11.
Geay et al., "Modular string-sensitive permission analysis with demand-driven precision," ICSE '09 31st International Conference on Software Engineering, May 2009: pp. 177-187.
Liu et al., "Practical static analysis for inference of security-related program properties," ICPC '09 IEEE 17th International Conference on Program Comprehension, May 2009: pp. 1-11.
Balzarotti et al., "Saner: Composing Static and Dynamic Analysis to Validate Sanitization in Web Applications," SP '08 Proceedings of the 2008 IEEE Symposium on Security and Privacy, May 2008: pp. 1-15.
Yasuhiko Minamide, "Static approximation of dynamically generated Web pages," WWW '05 Proceedings of the 14th International Conference on World Wide Web, May 2005: pp. 1-10.
Martin et al., "Understanding Software Application Interfaces via String Analysis," ICSE '06 Proceedings of the 28th International Conference on Software Engineering, May 2006: pp. 1-4.

\* cited by examiner

*Primary Examiner* — Gilberto Barron, Jr.
*Assistant Examiner* — Izunna Okeke
(74) *Attorney, Agent, or Firm* — Patterson & Sheridan, LLP

(57) ABSTRACT

A code construct in a computer-based software application is classified by seeding an analysis of an instruction code set of a computer-based software application with a seed for a seeding variable within the instruction code set, wherein the seed is an abstract value representation, performing the analysis to a fixed point, thereby producing a fixed point solution, selecting an invariant from the fixed point solution, wherein the invariant represents at least one value pointed to by a classification variable in a code construct within the instruction code set, and classifying the code construct with a classification that is applicable to the invariant in accordance with an application criterion.

15 Claims, 5 Drawing Sheets

```
300

302
Line 46    if(!goodExit){
Line 47        goodExit = true;
Line 48        document.location.href = document.location.href;
Line 49    }

304
```

```
Line 221    var subject = "Information from morganstanley.com";
Line 222    var message = "Please read the article below from morganstanley.com:";
Line 223    var newline = escape("\n\n");
Line 224    var link = document.location.href;
Line 225                              ⌣402
Line 226    var mymsg = "mailto:" + email + "?subject=" + subject + "&body=" + message + newline + link;
Line 227    document.location.href = mymsg;  ←404
Line 228    //alert (mymsg);
```

Fig. 4

CLASSIFICATION OF CODE CONSTRUCTS USING STRING ANALYSIS

FIELD OF THE INVENTION

The invention relates to analysis of computer-based software applications in general.

BACKGROUND OF THE INVENTION

Static analysis is often performed on instruction code of computer-based software applications to identify issues such as logic errors and security vulnerabilities within an instruction code set. For example, one common type of static analysis, referred to as taint analysis, is used to identify references within a code set that refer to data that come from or are influenced by an external and/or untrusted source (e.g., a malicious user), and are therefore vulnerable to attack. Unfortunately, taint analysis techniques are not perfect and often provide false positive identifications of vulnerabilities that are not really vulnerabilities.

SUMMARY OF THE INVENTION

A method, system and computer program product are provided for classifying a code construct in a computer-based software application, including seeding an analysis of an instruction code set of a computer-based software application with a seed for a seeding variable within the instruction code set, wherein the seed is an abstract value representation, performing the analysis to a fixed point, thereby producing a fixed point solution, selecting an invariant from the fixed point solution, wherein the invariant represents at least one value pointed to by a classification variable in a code construct within the instruction code set, and classifying the code construct with a classification that is applicable to the invariant in accordance with an application criterion.

BRIEF DESCRIPTION OF THE DRAWINGS

The invention will be understood and appreciated more fully from the following detailed description taken in conjunction with the appended drawings in which:

FIGS. 3 and 4 are simplified examples of instruction code to which the system of FIG. 1 and the method of FIG. 2 are applicable.

DETAILED DESCRIPTION OF THE INVENTION

Figure 1:
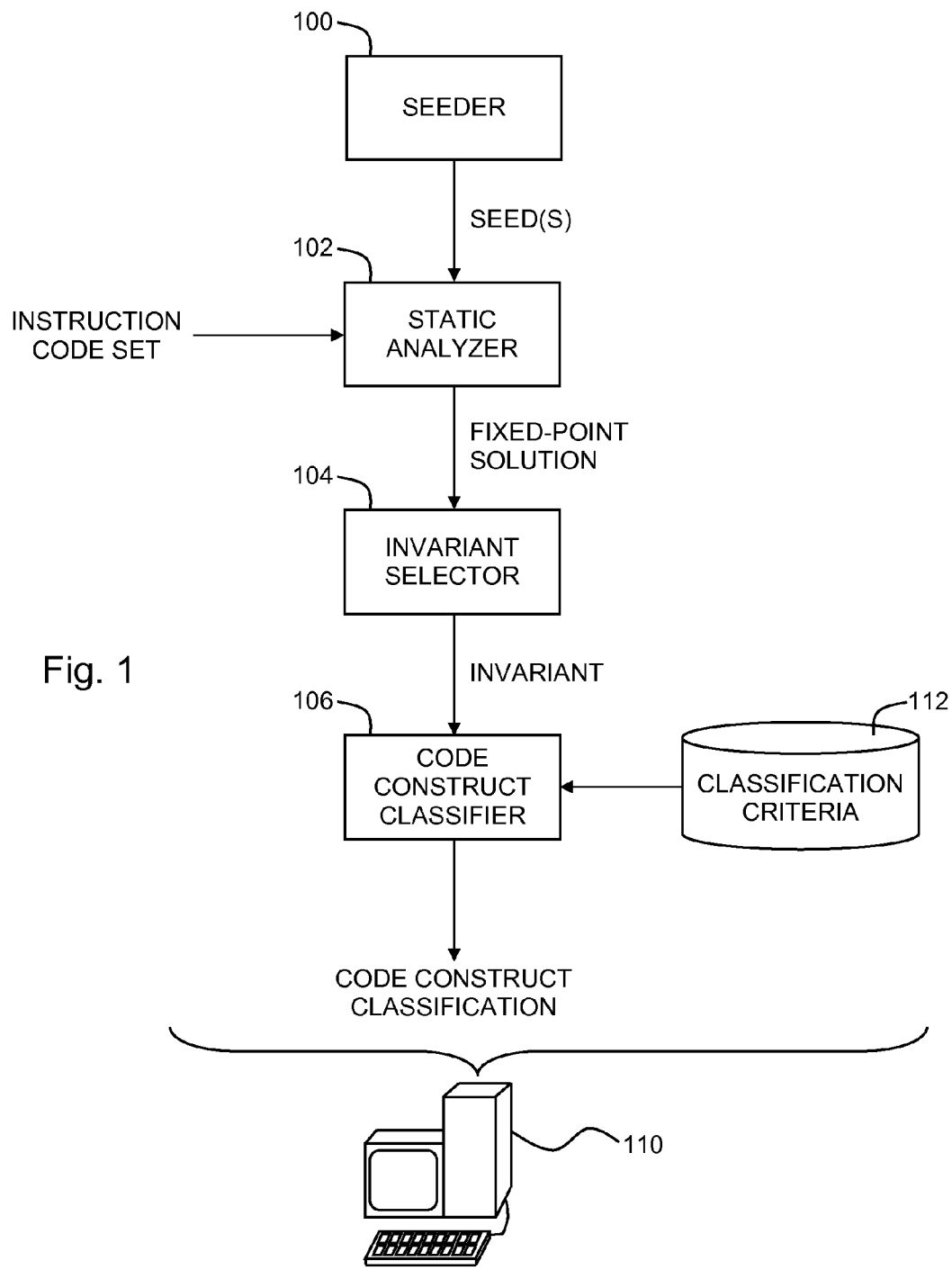
FIG. 1 is a simplified conceptual illustration of a system for classifying code constructs using string analysis, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for classifying code constructs using string analysis, constructed and operative in accordance with an embodiment of the invention. In the system of FIG. 1, a seeder 100 is configured to seed a static analysis of an instruction code set of a computer-based software application with at least one abstract value for at least one variable (hereinafter the "seeding" variable) within the instruction code set. A static analyzer 102 is configured to perform the seeded static analysis of the instruction code set to a fixed point, thereby producing a fixed point solution. An invariant selector 104 is configured to select an invariant from the fixed point solution, where the invariant represents the values pointed to by a variable (hereinafter the "classification" variable) used in a code construct within the instruction code set. A code construct classifier 106 classifies the code construct with a classification that is applicable to the invariant in accordance with predefined classification criteria 108.

Any of the elements shown in FIG. 1 are preferably implemented by one or more computers, such as a computer 110, by implementing any of the elements shown in FIG. 1 in computer hardware and/or in computer software embodied in a computer-readable storage medium in accordance with conventional techniques.

Figure 2:
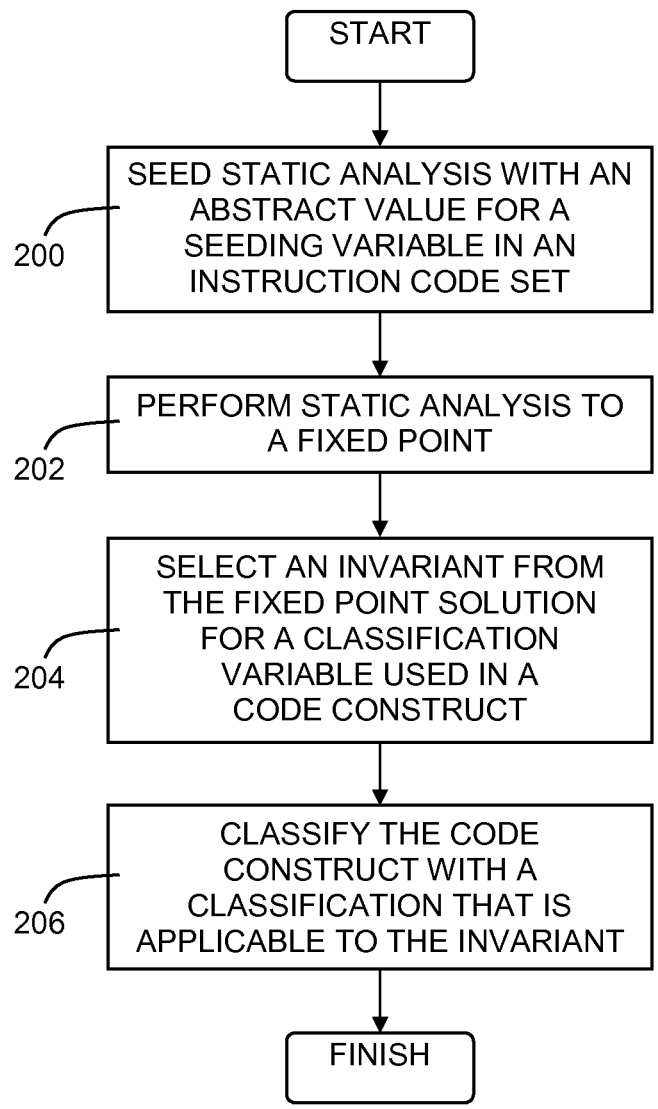
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, an analysis of an instruction code set of a computer-based software application is seeded with at least one abstract value for at least one variable (hereinafter the "seeding" variable) within the instruction code set (step 200). The analysis is then performed to a fixed point, thereby producing a fixed point solution (step 202). An invariant is selected from the fixed point solution, wherein the invariant represents the values pointed to by a variable (hereinafter the "classification" variable) used in a code construct within the instruction code set (step 204). The code construct is then classified with a classification that is applicable to the invariant in accordance with an classification criterion (step 206).

Figure 3:
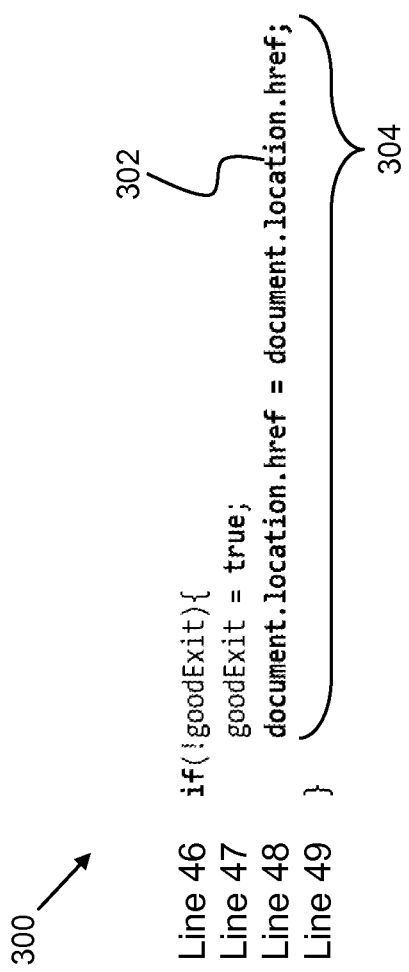

Application of the system of FIG. 1 and method of FIG. 2 may be demonstrated in the context of the example shown in FIG. 3, in which taint analysis is performed on an instruction code set 300 of a computer-based software application. Prior to performing the analysis, a tainted source 302, being the variable "document.location.href", is identified within the application, in accordance with conventional techniques, as feeding into a sink 304 at line 48, where source 302 and sink 304 are identified as candidates for the taint analysis. The analysis is seeded with an abstract value representation of the value defined by source 302, being the seeding variable, such as where the abstract value representation is modeled as a prefix portion having a known value that is not tainted, and a suffix portion representing an unknown value that is tainted. For example, where black-box testing of the application reveals a value of "http://www.mysite.com/index.html?name-Bob" for source 302, the analysis may be seeded using the abstract value representation "http://www.mysite.com/index.html?.*" for source 302, wherein the prefix "http://www.mysite.com/index.html?" is not tainted, and the suffix portion "*" is tainted. String analysis is then performed in accordance with conventional techniques, propagating the seed from source 302 to a fixed point, thereby producing a fixed point solution. An invariant is selected from the fixed point solution, wherein the invariant represents at least one value pointed to by the left-side variable "document.location.href", being the classification variable, at sink 304. The code construct of sink 304 is classified with a classification that is applicable to the invariant in accordance with a classification criterion, such as where the criterion indicates that the code construct is not a security vulnerability. For example, the code construct may be classified with a classification, such as "not tainted", indicating that the code construct does not represent a security vulnerability where the criterion that indicates that a sink is not tainted if the prefix of the invariant is not tainted, or where the prefix is not tainted and includes a '?'.

It is appreciated that where existing taint analysis techniques would report a security vulnerability at line 48 in the instructions shown in FIG. 3 as a tainted URL flowing into a redirect target, thus providing a false positive result, by classifying the code construct at line 48 as "not tainted", the present invention would prevent the false positive result.

Application of the system of FIG. 1 and method of FIG. 2 may be further demonstrated in the context of the example shown in FIG. 4, in which taint analysis is performed on an instruction code set 400 of a computer-based software application. Prior to performing the analysis, a tainted source 402, being the variable "link" at line 224, is identified within the application, in accordance with conventional techniques, as feeding into a sink 404 at line 227, where source 402 and sink 404 are identified as candidates for the taint analysis. The analysis is seeded with an abstract value representation of the value defined by source 402, being the seeding variable, such as where the abstract value representation is "http://www.mysite.com/index.html?.*". String analysis is then performed in accordance with conventional techniques, propagating the seed from line 224 to a fixed point, thereby producing a fixed point solution. The invariant for the variable "mymsg" at line 227 is then selected from the fixed point solution. The code construct of sink 404 is classified as being vulnerable to "mail spoofing" where this classification is applicable to the invariant in accordance with an application criterion, such as a criterion that indicates that a code construct using strings that always begin with "mailto:" and that have untrusted portions, should be classified as being vulnerable to "mail spoofing".

It is appreciated that where existing taint analysis techniques would report the vulnerability shown in FIG. 4 as an "Open Redirect" vulnerability in accordance with an original specification, the present invention would classify the vulnerability as a "mail spoofing" vulnerability, thereby providing more refined analysis results relative to the original specification.

Figure 5:
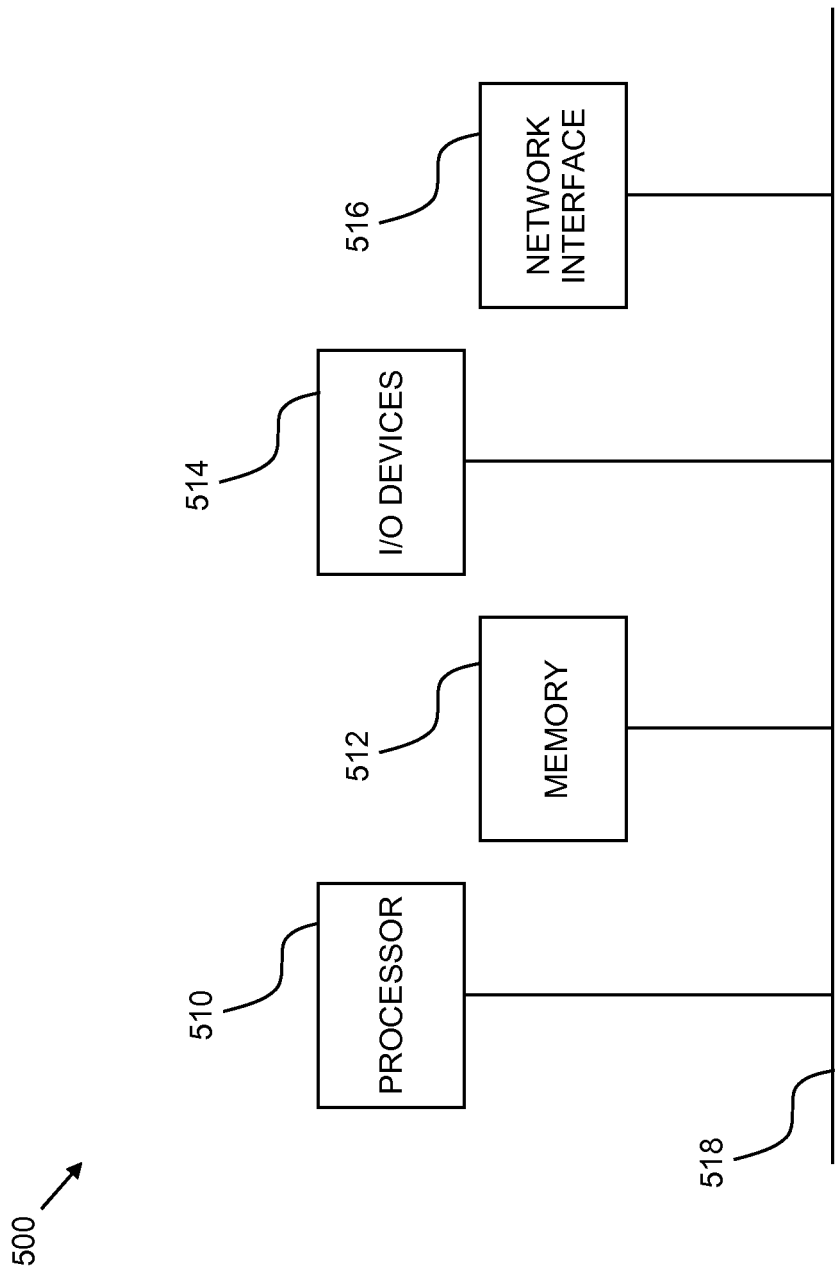
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for classifying a code construct in a computer-based software application, the method comprising:
   seeding an analysis of an instruction code set of a computer-based software application with a seed for a seeding variable within the instruction code set, wherein the seed is an abstract value representation comprising a prefix portion having a known value that is not tainted and a suffix portion representing an unknown value that is tainted;
   performing the analysis, by operation of one or more computer processors, to a fixed point, thereby producing a fixed point solution;
   selecting an invariant from the fixed point solution, wherein the invariant represents at least one value pointed to by a classification variable in a code construct within the instruction code set; and
   classifying the code construct with a classification that is applicable to the invariant in accordance with an application criterion, comprising upon determining that a prefix portion of the invariant is not tainted, determining that the code construct is not tainted and classifying the code construct as not being a security vulnerability.

2. The method of claim 1 and further comprising:
   identifying a tainted source within the application; and
   identifying a sink within the application,
   wherein seeding the analysis of the instruction code set further comprises seeding the analysis using the tainted source as the seeding variable, and
   wherein the selecting further comprises selecting the invariant using the sink as the code construct.

3. The method of claim 2 wherein the seeding step comprises seeding where the abstract value representation is of a value defined by the tainted source.

4. The method of claim 2 wherein the performing step comprises propagating the seed from the source to the fixed point using string analysis.

5. The method of claim 1 wherein the classifying step comprises classifying the code construct where the classification is a refinement relative to an original specification that is applicable to the code construct.

6. A system comprising:
   a processor; and
   a memory containing a program that, when executed by the processor, performs an operation for classifying a code construct in a computer-based software application, the operation comprising:
      seeding an analysis of an instruction code set of a computer-based software application with a seed for a seeding variable within the instruction code set, wherein the seed is an abstract value representation comprising a prefix portion having a known value that is not tainted and a suffix portion representing an unknown value that is tainted;

performing the analysis to a fixed point, thereby producing a fixed point solution;

selecting an invariant from the fixed point solution, wherein the invariant represents at least one value pointed to by a classification variable in a code construct within the instruction code set; and classifying the code construct with a classification that is applicable to the invariant in accordance with an application criterion, comprising upon determining that a prefix portion of the invariant is not tainted, determining that the code construct is not tainted and classifying the code construct as not being a security vulnerability.

7. The system of claim 6 wherein the static analyzer is configured to identify a tainted source within the application, and identify a sink within the application, wherein the tainted source is the seeding variable, and wherein the sink is the code construct.

8. The system of claim 7 wherein the abstract value representation is of a value defined by the tainted source.

9. The system of claim 7 wherein performing the analysis to a fixed point further comprises propagating the seed from the source to the fixed point using string analysis.

10. The system of claim 6 wherein the classification is a refinement relative to an original specification that is applicable to the code construct.

11. A computer program product for classifying a code construct in a computer-based software application, the computer program product comprising:

computer-readable program code embodied in a computer-readable storage medium, wherein the computer-readable program code is configured to:

seed an analysis of an instruction code set of a computer-based software application with a seed for a seeding variable within the instruction code set, wherein the seed is an abstract value representation comprising a prefix portion having a known value that is not tainted and a suffix portion representing an unknown value that is tainted, perform the analysis to a fixed point, thereby producing a fixed point solution, select an invariant from the fixed point solution, wherein the invariant represents at least one value pointed to by a classification variable in a code construct within the instruction code set, and classify the code construct with a classification that is applicable to the invariant in accordance with an application criterion, comprising upon determining that a prefix portion of the invariant is not tainted, determining that the code construct is not tainted and classifying the code construct as not being a security vulnerability.

12. The computer program product of claim 11 wherein the computer-readable program code is configured to identify a tainted source within the application, and identify a sink within the application, wherein the tainted source is the seeding variable, and wherein the sink is the code construct.

13. The computer program product of claim 12 wherein the abstract value representation is of a value defined by the tainted source.

14. The computer program product of claim 12 wherein the computer-readable program code is configured to propagate the seed from the source to the fixed point using string analysis.

15. The computer program product of claim 11 wherein the classification is a refinement relative to an original specification that is applicable to the code construct.

* * * * *